United States Patent [19]

Lee et al.

[11] Patent Number: 5,649,057
[45] Date of Patent: Jul. 15, 1997

[54] SPEECH RECOGNITION EMPLOYING KEY WORD MODELING AND NON-KEY WORD MODELING

[75] Inventors: Chin-Hui Lee, New Providence; Lawrence Richard Rabiner, Berkeley Heights; Jay Gordon Wilpon, Warren, all of N.J.

[73] Assignee: Lucent Technologies Inc., Murray Hill, N.J.

[21] Appl. No.: 586,413

[22] Filed: Jan. 16, 1996

Related U.S. Application Data

[62] Division of Ser. No. 132,430, Oct. 6, 1993, Pat. No. 5,509,104, which is a continuation of Ser. No. 977,743, Nov. 16, 1992, abandoned, which is a continuation of Ser. No. 835,006, Feb. 12, 1992, abandoned, which is a continuation of Ser. No. 625,773, Dec. 7, 1990, abandoned, which is a continuation of Ser. No. 353,283, May 17, 1989, abandoned.

[51] Int. Cl.$^6$ ........................................... G10L 9/00
[52] U.S. Cl. ............................................... 395/2.65
[58] Field of Search ............................. 395/2.4, 2.45, 395/2.54, 2.6–2.66; 381/41–45

[56] References Cited

U.S. PATENT DOCUMENTS

| Re. 32,012 | 10/1985 | Pirz et al. | 381/43 |
|---|---|---|---|
| 4,481,593 | 11/1984 | Bahler | 364/513.5 |
| 4,713,777 | 12/1987 | Klovstad et al. | 395/2.42 |
| 4,783,804 | 11/1988 | Juang et al. | 395/2.54 |
| 4,802,231 | 1/1989 | Davis | 382/34 |
| 4,811,399 | 3/1989 | Landell et al. | 381/43 |
| 4,827,521 | 5/1989 | Bahl et al. | 395/2.65 |
| 4,829,577 | 5/1989 | Kuroda et al. | 395/2.65 |
| 4,837,831 | 6/1989 | Gillick et al. | 381/43 |
| 4,914,703 | 4/1990 | Gillick | 395/2.54 |
| 4,977,599 | 12/1990 | Bahl et al. | 395/2.65 |
| 5,199,077 | 3/1993 | Wilcox et al. | 381/43 |
| 5,218,668 | 6/1993 | Higgins et al. | 395/2 |
| 5,440,662 | 8/1995 | Sukkar | 395/2.45 |
| 5,452,397 | 9/1995 | Ittycheriah et al. | 395/2.49 |

FOREIGN PATENT DOCUMENTS

| 0177854 | 9/1985 | European Pat. Off. | G10L 5/04 |

OTHER PUBLICATIONS

Rohlicek et al, "Continuous Hidden Markov Modeling For Speaker–Independent Word Spotting", *IEEE International Conference on Acoustics, Speech, and Signal Processing*, vol. 1, 627–630 (May 1988).

Wilpon et al., "Isolated Word Recognition Over the DDD Telephone Network—Results of Two Extensive Field Studies," *IEEE International Conference on Acoustics, Speech, and Signal Processing*, vol. 1, 55–58 (Apr. 1988).

Markowitz, "Keyword Spotting in Speech", AI Expert, pp. 21–25 Oct. 1994.

Wilpon et al., "Automatic Recognition of Keywords in Unconstrained Speech Using Hidden Markov Models", IEEE Trans. on Acoustics Speech and Signal Proc., vol. 38, No. 11, pp. 1870–1878 Nov. 1990.

(List continued on next page.)

*Primary Examiner*—Allen R. MacDonald
*Assistant Examiner*—Vijay B. Chawan
*Attorney, Agent, or Firm*—Ronald D. Slusky

[57] ABSTRACT

Speaker independent recognition of small vocabularies, spoken over the long distance telephone network, is achieved using two types of models, one type for defined vocabulary words (e.g., collect, calling-card, person, third-number and operator), and one type for extraneous input which ranges from non-speech sounds to groups of non-vocabulary words (e.g. 'I want to make a collect call please'). For this type of key word spotting, modifications are made to a connected word speech recognition algorithm based on state-transitional (hidden Markov) models which allow it to recognize words from a pre-defined vocabulary list spoken in an unconstrained fashion. Statistical models of both the actual vocabulary words and the extraneous speech and background noises are created. A syntax-driven connected word recognition system is then used to find the best sequence of extraneous input and vocabulary word models for matching the actual input speech.

7 Claims, 6 Drawing Sheets

OTHER PUBLICATIONS

"Detecting and Locating Key Words in Continuous Speech Using Linear Predictive Coding," by Christiansen and Rushforth, IEEE Transactions on Acoustics, Speech and Signal Processing, vol. ASSP 25 No. 5, pp. 362–367, Oct. 1977.

"Keyword Recognition Using Template Concatenation," by Higgins and Wohlford, IEEE Int. Conf. Acous. Speech, and Signal Processing, pp. 1233–1236, Mar. 1985.

"Application of Hidden Markov Models to Automatic Speech Endpoint Detection," by Wilpon and Rabiner, Computer Speech and Language, vol. 2, 3/4 pp. 321–341, Dec. 1987.

Digital Processing of Speech Signals, L. R. Rabiner et al., Prentice Hall, pp. 356–372 and 398–401 (1978).

"The Frequency Analysis of Time Series for Echoes," Proc. Symp. on Time Series Analysis, Bo Bogert et al., Ch. 15, pp. 209–243, 1963.

Digital Processing of Speech Signals, by L. R. Rabiner et al., Prentice Hall, pp. 121 (1978).

"The Use of Bandpass Filtering in Speech Recognition," IEEE Transactions on Acoustics, Speech and Signal Processing, by B. Juang et al., ASSP 35, no. 7, pp. 947–954, Jul. 1987.

"On the Use of Instantaneous and Transitional Spectral Information in Speaker Recognition," by F. K. Soong et al., IEEE Transactions on Acoustics, Speech and Signal Processing, vol. ASSP 36, No. 6, pp. 871–879, Jun. 1988.

"High Performance Connected Digit Recognition Using Hidden Markov Models," by L. R. Rabiner et al., IEEE International Conference on Acoustics, Speech and Signal Processing, vol. 1, pp. 119–122, Apr. 1988.

"A Network–Based Frame Synchronous Level Building Algorithm for Connected Word Recognition," by C–H. Lee et al., IEEE Int. Conf. Acous. Speech and Sig. Processing, vol. 1, pp. 410–413, Apr. 1988.

"A Segmental K–means Training Procedure for Connected with Recognition Based on Whole Word Reference Patterns," by L. R. Rabiner et al., AT&T Technical Journal, vol. 65, No. 3, pp. 21–31, May 1986.

SPEECH RECOGNITION EMPLOYING KEY WORD MODELING AND NON-KEY WORD MODELING

CROSS-REFERENCE TO RELATED APPLICATION

This is a division of application Ser. No. 08/132,430 filed Oct. 6, 1993, now U.S. Pat. No. 5,509,104 which was a continuation of application Ser. No. 07/977,743 filed Nov. 16, 1992; which was a continuation of application Ser. No. 07/835,006 filed Feb. 12, 1992; which was a continuation of application Ser. No. 07/625,773 filed Dec. 7, 1990; which was a continuation of application Ser. No. 07/353,283 filed May 17, 1989.

FIELD OF THE INVENTION

This invention relates to techniques for automatic recognition of speech including selected key words.

BACKGROUND OF THE INVENTION

The development of robust, speaker-independent, speech recognition systems that perform well over dialed-up telephones line has been a topic of interest for over a decade. Initially, speech recognition systems could recognize a small number of vocabulary items spoken in isolation; more recently systems have been disclosed that can recognize medium-size vocabulary sets spoken fluently, as set out in U.S. Pat. No. 4,783,804 assigned to B-H. Juang et al, issued Nov. 8, 1988. A basic assumption for most speech recognition systems is that the input to be recognized consists solely of words from the recognition vocabulary and background silence. However, recent studies on the recognition of a limited set of isolated command phrases for making "operator assisted calls" have shown that it is extremely difficult, if not impossible, to always get real-world subscribers to such a service to speak only the allowed input words. In a large scale trial of speaker independent, isolated word, speech recognition technology, carried out at an AT&T central office in Hayward, Calif. (in the San Francisco Bay area), live telephone customer traffic was used to evaluate the call handling procedures being developed for a new generation of telephone switching equipment. Customers, making operator assisted calls, were requested to verbally identify the type of call they wished to make (i.e. collect, calling-card, person-to-person, bill-to-third, and operator). Each caller was requested to speak one of five orally prompted commands in an isolated fashion. While 82% of the users actually spoke one of the command words, only 79% of these inputs were spoken in isolation (i.e. only 65% of all the callers followed the protocol). Monitoring the customer's spoken responses showed that 17% of all responses contained a valid vocabulary item along with extraneous speech input. Examples included the following: •<silence> collect call please <silence> • Um? Gee, ok I'd like to place a calling-card call • Collect from Tom <silence> • I want a person call • <silence> Please give me the operator Most conventional isolated word recognition algorithms have not been designed to recognize vocabulary items embedded in carrier sentences. As such, modifications to the algorithms have to be made to allow for the recognition of the defined vocabulary words embedded in extraneous speech, i.e. to spot keywords.

While much research has been performed on the general wordspotting problem, most of it has not been published. The published wordspotting techniques are primarily template-based, dynamic time-warping approaches. For example, in the article "Detecting and Locating Key Words in Continuous Speech Using Linear Predictive Coding", *IEEE Transactions on Acoustics, Speech and Signal Processing*, Vol ASSP. 25 No. 5, pp. 362–367, October, 1977, Christiansen and Rushforth describe a speaker trained keyword spotting system which uses an LPC representation of the speech signal without any syntactic or semantic information about the task. Using this approach they achieved good wordspotting accuracy on a vocabulary set of four keywords and ten digits.

Higgins and Wohlford in "Keyword Recognition Using Template Concatenation", Conf. Rec. *IEEE Int. Conf. Acous. Speech, and Signal Processing*, pp. 1233–1236, Tampa, Fla., March, 1985, proposed a dynamic-time-warping based system for keyword spotting. In their system, knowledge about the vocabulary and syntax of the input speech was used. A set of keyword templates and non-keyword templates was created and compared against several pooled filler templates in order to detect keywords in fluent speech. These filler templates were generated (1) using data from six 'function' words, or (2) by clustering non-vocabulary words into segments roughly equal to syllables using hand-marked data. Their results indicated that while explicit knowledge of the vocabulary may not be that important, the use of filler templates may be important. However, they found that the number of such filler templates greatly influenced the performance of the keyword spotter. Additionally, they determined that the durations of the filler templates controlled the accuracy of their system. As the number of templates increased and the duration of the average filler template shortened, the system accuracy improved. Duration constraints are a major problem in any dynamic-time-warping based template matching recognition system, since each template has a physical duration and the algorithms are forced to adhere to some local time duration constraints.

Similarly, in the prior patent of one of us, Chin-Hui Lee with John W. Klovstad and Kalyan Ganesan, U.S. Pat. No. 4,713,777, issued Dec. 15, 1987, a Hidden Markov Model (HMM) was used to model silence. Fixed score thresholds were used to eliminate false alarms.

In the article, "Application of Hidden Markov Models to Automatic Speech Endpoint Detection, *Computer Speech and Language*, Vol. 2, 3/4 pp. 321–341, December, 1987, two of us, Wilpon and Rabiner, presented a statistically-based recognition algorithm, in which explicit endpoint detection of speech was removed entirely from the recognition system while maintaining high recognition accuracy. To achieve this, the recognition system modeled the incoming signal as a sequence of background signal and vocabulary words. However, this work was limited in that the vocabulary words had to be spoken in isolation, i.e., with no extraneous verbal input.

SUMMARY OF THE INVENTION

We have discovered that it is possible to successfully model the background sounds including verbal sounds (extraneous speech) that occur in proximity to keywords that must be recognized.

We have further discovered that, given sufficient data to train such a model, the use of only one such background model can perform almost as well as a plurality of such models. This discovery was not predictable from the above-cited prior art.

In accordance with one feature of our invention, a statistically-based model, commonly called a Hidden Markov Model (hereinafter, HMM), is used for recognizing specified vocabulary words (hereinafter called keywords) in the context of unconstrained speech. Our invention is based on the grammatical concept of the above-cited Wilpon et al, reference. The approach that we have developed models the entire background environment, including silence, room environment, transmission noises, and most importantly extraneous speech. We represent a given speech input as an unconstrained sequence of such extraneous inputs followed by a keyword, followed by another unconstrained sequence of extraneous inputs, although in the broadest context, only one such nexus need be required. We do this by creating at least one hidden Markov model representative of extraneous speech. A grammar-driven continuous word recognition system is used to determine the best sequence of extraneous speech and keywords.

Given this structure for a recognition system, the use of so-called sink (general) models for the extraneous speech allows the recognizer to recognize the extraneous signals, at the same time that the keywords are recognized.

BRIEF DESCRIPTION OF THE DRAWINGS

Other features and advantages of our invention will become apparent from the following detailed description, together with the drawings, in which.

GENERAL DESCRIPTION

Figure 1:
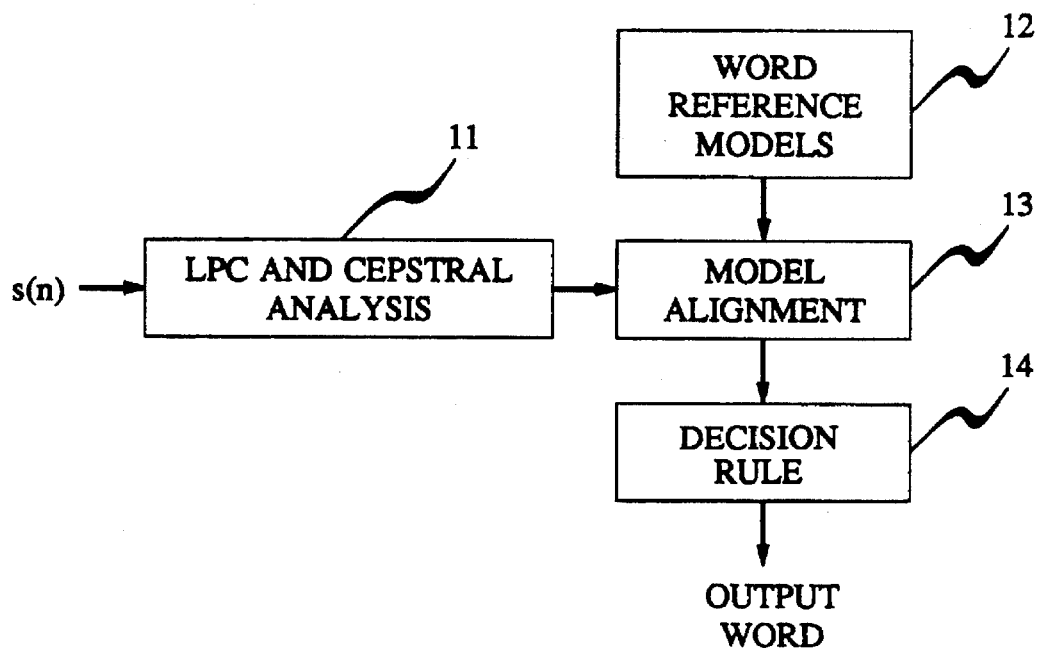
FIG. 1 shows a general flow diagram of the recognition system in which our invention can be used.

In referring to the general flow diagram of FIG. 1, we see that the starting point is to obtain a representation, s(n), derived from a speech signal. In general, the speech is digitized, filtered, pre-emphasized and blocked into frames, all procedures being conventional, to produce s(n). While it is not a requirement of our invention, we have found it convenient that s(n) be analyzed to give a set of LPC-derived cepstral vectors.

The resulting feature vectors, namely, LPC and cepstrum 11, obtained using conventional processing of signal s(n), is fed into the model alignment step 13, including valid grammatical rules, where comparison of the feature vectors of s(n) is made to the two types of word reference models described briefly above, in the Summary of the Invention. The final best estimate, from box 14, is transmitted as the best keyword, that is, the keyword associated with the best match to the feature vectors of s(n) according to the grammar.

DETAILED DESCRIPTION

Illustratively in FIG. 1, to produce s(n), the digitizing occurs at a 6.67 kHz rate and the filtered speech bandwidth is 100–3200 Hz. Other particular sampling rates and filter bandwiths may, of course, be used. The pre-emphasis factor, in typical practice may be a=0.95, and the frames typically are 45 msec. in length with a shift between flames of 15 msec.

The LPC and cepstral analysis 11 is then performed, following the techniques set out by L. R. Rabiner et al in the book *Digital Processing of Speech Signals*, Prentice Hall, Englewood Cliffs, N.J. (1978) pp. 356–372 and 398–401, and/or following the techniques set out in the paper by B. Bogert et al, "The Quefrency Analysis of Time Series for Echoes", *Proc. Syrup. on Time Series Analysis*, M. Rosenblatt, Ed., Ch. 15, pp. 209–243, J. Wiley, New York, 1963. Each frame of speech is weighted by a Hamming window, as set out at page 121 in the above-cited book by L. R. Rabiner et al. A p-th order, illustratively 8-th order, linear predictive coding (LPC) analysis is then performed on the data. For each frame, a set of eight LPC coefficients is generated. The resulting signal is then reduced to a sequence of LPC frame vectors, as is known in the art. It should be noted that there is no automatic endpoint detection performed on the data.

The LPC-derived cepstral vector is then computed, from the LPC frame vector, up to the $Q^{th}$ component, where Q=12 in our implementation (note that, illustratively, Q>p).

The Q-coefficient cepstral vector, $c_l(m)$, at time frame l is weighted by a window, $W_c(m)$, of the form:

$$W_c(m) = \left[1 + \frac{Q}{2} \sin\left[\frac{\pi m}{Q}\right]\right], 1 \leq m \leq Q \quad (1)$$

to give:

$$\hat{c}_l(m) = c_l(m) \cdot W_c(m) \quad (2),$$

as detailed in the article by B. Juang et al, "The Use of Bandpass Liftering in Speech Recognition", *IEEE Transactions on Acoustics, Speech and Signal Processing*, ASSP 35, No. 7, pp. 947–954, July, 1987.

It has recently been shown that by extending the analysis vector to include spectral derivative (in time) information, performance of several standard speech recognizers improves significantly. We include such spectral derivative information in our analysis vector as follows.

The time derivative of the sequence of weighted cepstral vectors is approximated by a first order orthogonal polynomial over a finite length window of (2K+1) frames, centered around the current vector. (K=2 in our implementation; hence the derivative is computed from a 5 frame (75 msec) window.) The cepstral derivative (i.e. the delta cepstrum vector) is computed as $$\Delta\hat{c}_l(m) = \left[\sum_{k=-K}^{K} k\hat{c}_{l-k}(m)\right] \cdot G, 1 \leq m \leq Q \quad (3)$$

where G is a gain term so that the variances of $\hat{c}_l(m)$ and $\Delta\hat{c}_l(m)$ are about the same. (For our system the value of G was 0.375.) For details of the typical calculation, see the article by F. K. Soong et at, "On the Use of Instantaneous and Transitional Spectral Information in Speaker Recognition", *IEEE Transactions on Acoustics, Speech and Signal Processing*, Vol. ASSP 36, No. 6, pp. 871–879, June, 1988.

The overall observation vector, $O_l$, used for scoring the HMM's is the concatenation of the weighted cepstral vector, and the corresponding weighted delta cepstrum vector, i.e.

$$O_l = \{\hat{c}_l(m), \Delta\hat{c}_l(m)\} \quad (4)$$

and consists of 24 coefficients per vector.

This technique is further described in the article by L. R. Rabiner et at, "High Performance Connected Digit Recognition Using Hidden Markov Models," Conference Record, *IEEE International Conference on Acoustics Speech and Signal Processing*, Vol. 1, pp. 119–122, New York, N.Y., April, 1958.

Figure 3:
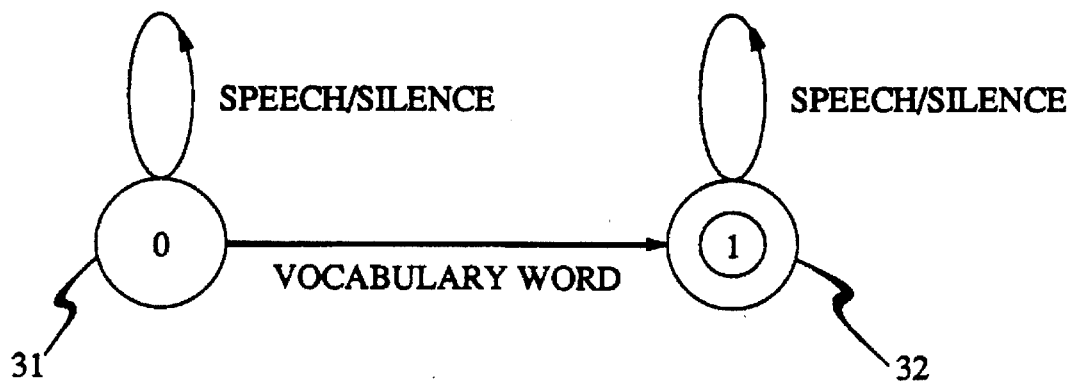
FIG. 3 shows the most typical grammatical sequence occurring in the practice of our invention.

The sequence of spectral vectors of an unknown speech utterance is matched against a set of stored word-based hidden Markov models 12 using a frame-synchronous level-building (FSLB) algorithm 13 (described in the article by C-H. Lee et al, "A Network-Based Frame Synchronous Level Building Algorithm for Connected Word Recognition," *Conf. Rec. IEEE Int. Conf. Acous. Speech and Sig. Processing*, Vol. 1, pp. 410–413, New York, N.Y., April 1988), with Viterbi matching within levels. Word and state duration probabilities, as will be described with reference to FIG. 2, have been incorporated into the HMM scoring and network search in the model alignment procedure 13. A finite state grammar, describing the set of valid sentence inputs, described hereinafter with reference to FIG. 3, is used to drive the recognition process. The FSLB algorithm in procedure 13 performs a maximum-likelihood string decoding on a frame-by frame basis, therefore making optimally decoded partial strings available at any time. The output of this process is a set of valid candidate strings.

In order to generate one or more word models from a training data set of labeled speech, a segmental k-means training algorithm is used, as set out in the article by L. R. Rabiner et el, "A Segmental K-means Training Procedure for Connected with Recognition Based on Whole Word Reference Patterns" *AT&T Technical Journal*, Vol 65, No 3, pp. 21–31, May, 1986. This word-building algorithm (i.e. an estimation procedure for determining the parameters of the HMMs) is iterated for each model until convergence (i.e. until the difference in likelihood scores in consecutive iterations is sufficiently small).

To create multiple models per word an HMM-based clustering algorithm is used to split previously defined clusters, see the above-cited article by Soong et al. This algorithm, or subsequent improvements, all based on the likelihoods obtained from HMMs, separates out from the set of training tokens those tokens whose likelihood scores fall below some fixed or relative threshold. That is, we separate out all the tokens with poor likelihood scores and create a new model out of these so-called outliers tokens. Once the tokens have been clustered, the segmental k-means training algorithm is again used to give the optimal set of parameters for each of the models.

Figure 2:
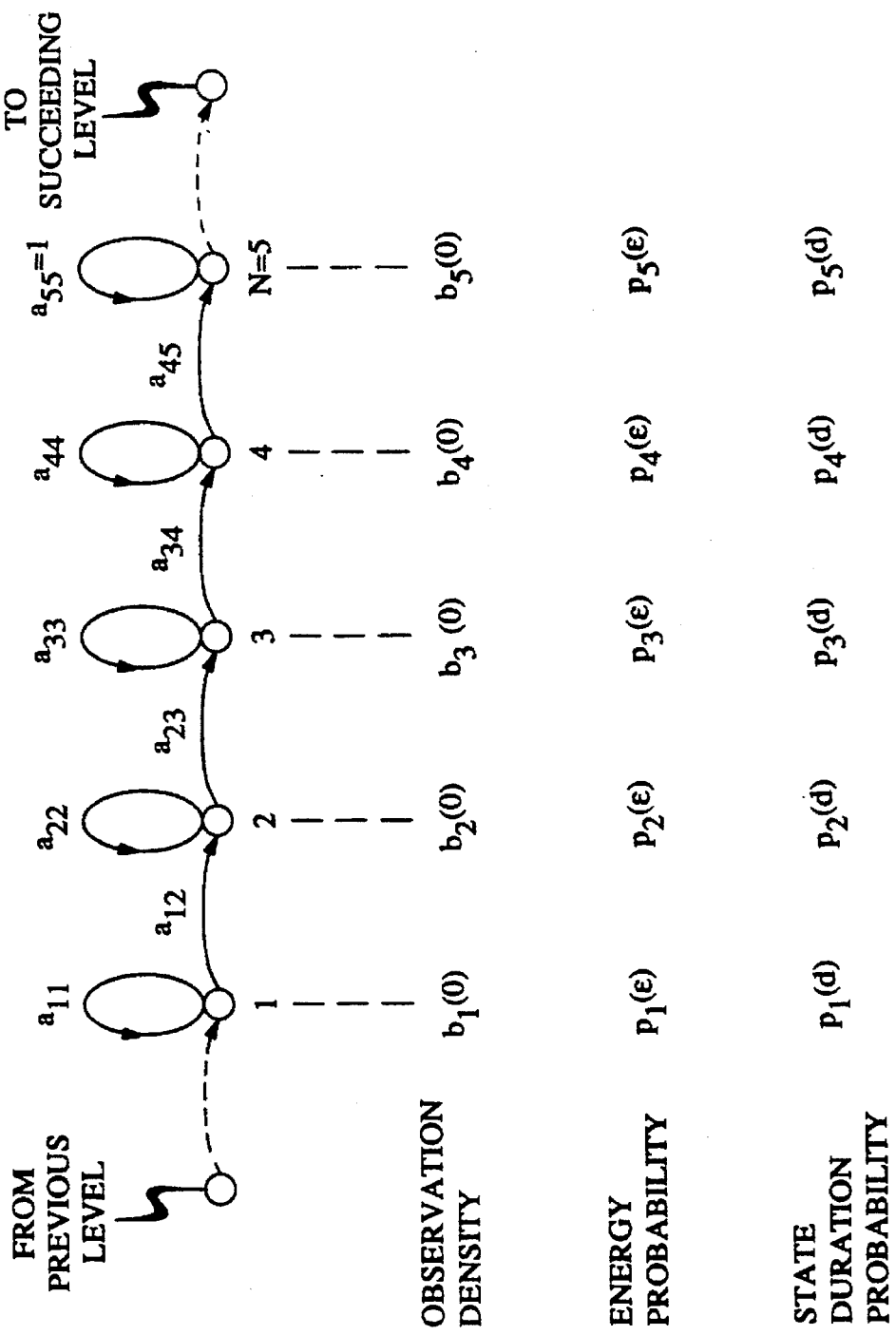
FIG. 2 shows a diagram of the state-transitional model and related parameters used used in our invention.

FIG. 2 illustrates the structure of the HMM's used to characterize individual words as well as the background environment, including extraneous speech. The models are first order, left-to-right, Markov models with N states. Each model is completely specified by the following:

[1] a state transition matrix, $A = a_{ij}$ with the constraint that $$a_{ij} = 0, j < i, j \geq i+2 \qquad (5)$$

(i.e. we allow transitions from state j only to itself, or to state j+1).

[2] state observation density matrix $B = b_j(x)$ consisting of a mixture (sum) of M Gaussian densities, of the form $$b_j(x) = \sum_{m=1}^{M} c_{mj} N\{x, \mu_{mj}, U_{mj}\} \qquad (6)$$

where x is the input observation vector, $c_{mj}$ is the mixture weight for the mth component in state j, $\mu_{mj}$ is the mean vector for mixture m in state j, and $U_{mj}$ is the covariance for mixture m in state j, (see the above-cited patent by Juang et at.) All evaluations described in this paper used diagonal covariance matrices. In our evaluations, the number of states per model was set to 10 and the number of mixture components per state, M, was set to nine.

[3] a set of log energy densities, $p_j(\epsilon)$, where $\epsilon$ is the dynamically normalized frame energy, and $p_j$ is an empirically measured discrete density of energy values in state j.

[4] a set of state duration probabilities, $\hat{p}_j(\tau)$, where $\tau$ is the number of frames spent in state j, and $\hat{p}_j$ is an empirically measured discrete density of duration values in state j.

The grammar used in the recognition process of the present invention is integrated into the recognition process in the same manner as described in the above-cited Lee et al reference. This grammar permits the recognition of keywords in a sequence which includes any number of keywords, including zero keywords, interspersed within any number, including zero, sink (extraneous speech) models and background silence models. The grammar is the set of rules which define and limit the valid sequences of recognizable units.

In the decision rule procedure 14, based upon a comparison of different probability scores, it is decided whether a final decision can be made, or if some alternative system procedure should be invoked.

To evaluate this new procedure, we selected a typical recognition task for which we knew, a priori, that only one keyword appears in any utterance, hence we limit the grammar to find exactly one keyword. This is shown graphically in FIG. 3, where node 0 (31) is the starting node and node 1 (32) is the terminal node.

The sink models and background models are generated automatically, using the training procedures described above, from a large pool of extraneous speech signals. These signals contain extraneous speech as well as background signal. This will be discussed further below.

The recognition algorithm just described relies on the ability to create a robust model of non-vocabulary background signals. Our goal is to be able to automatically generate the sink models with no user interaction. In the material that follows we describe several training techniques—both semiautomatic and fully automatic. We show that sink models can be generated with no user interaction, while maintaining high recognition preformence.

The simplest training procedure is to generate the sink models from specific words that occur most often in the extraneous speech. This requires that we have a labeled database indicating where such out-of-vocabulary words occur.

Figure 4:
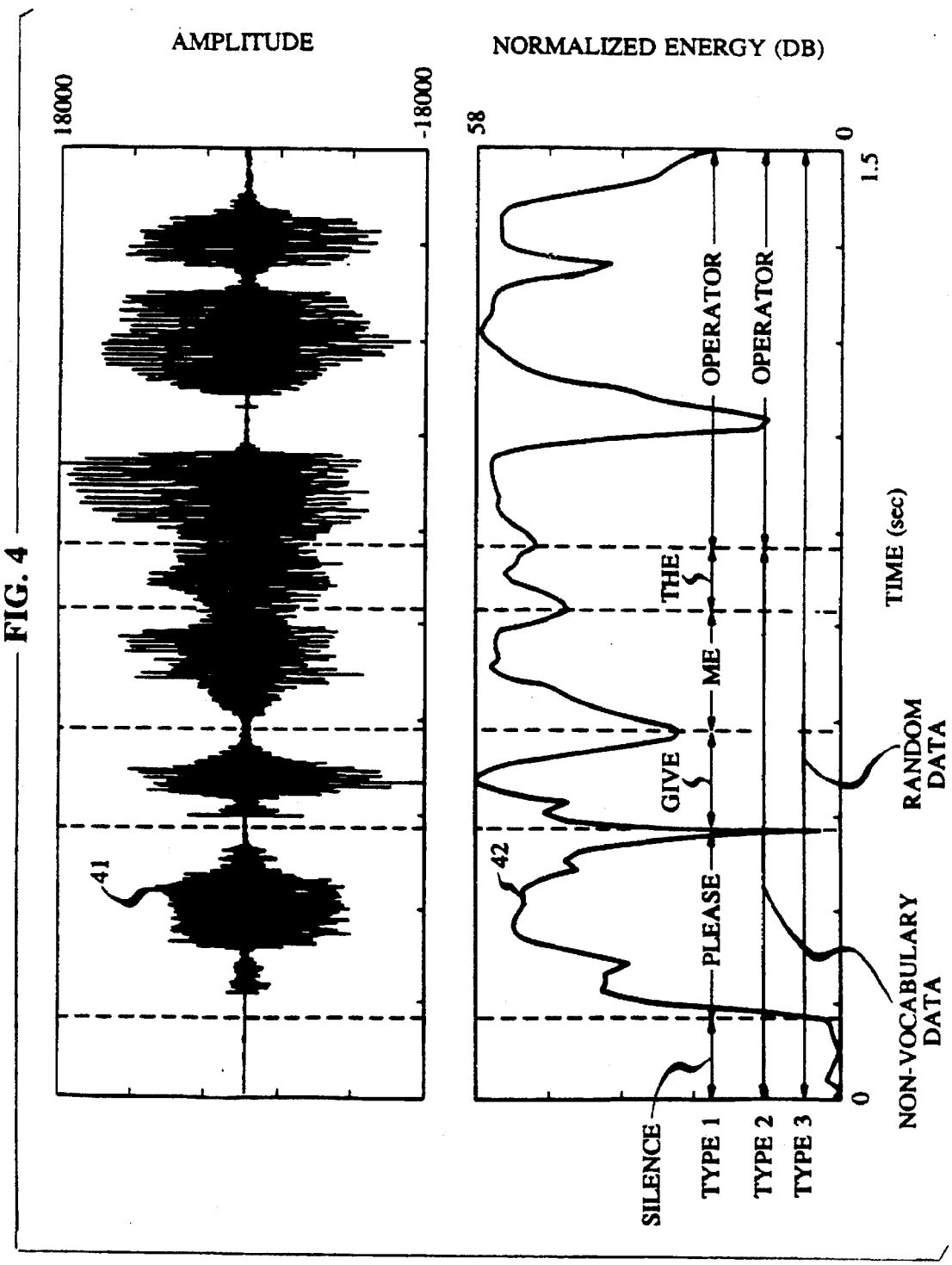
FIGS. 4, 5 and 6 show curves useful in explaining the invention.
Figure 5:
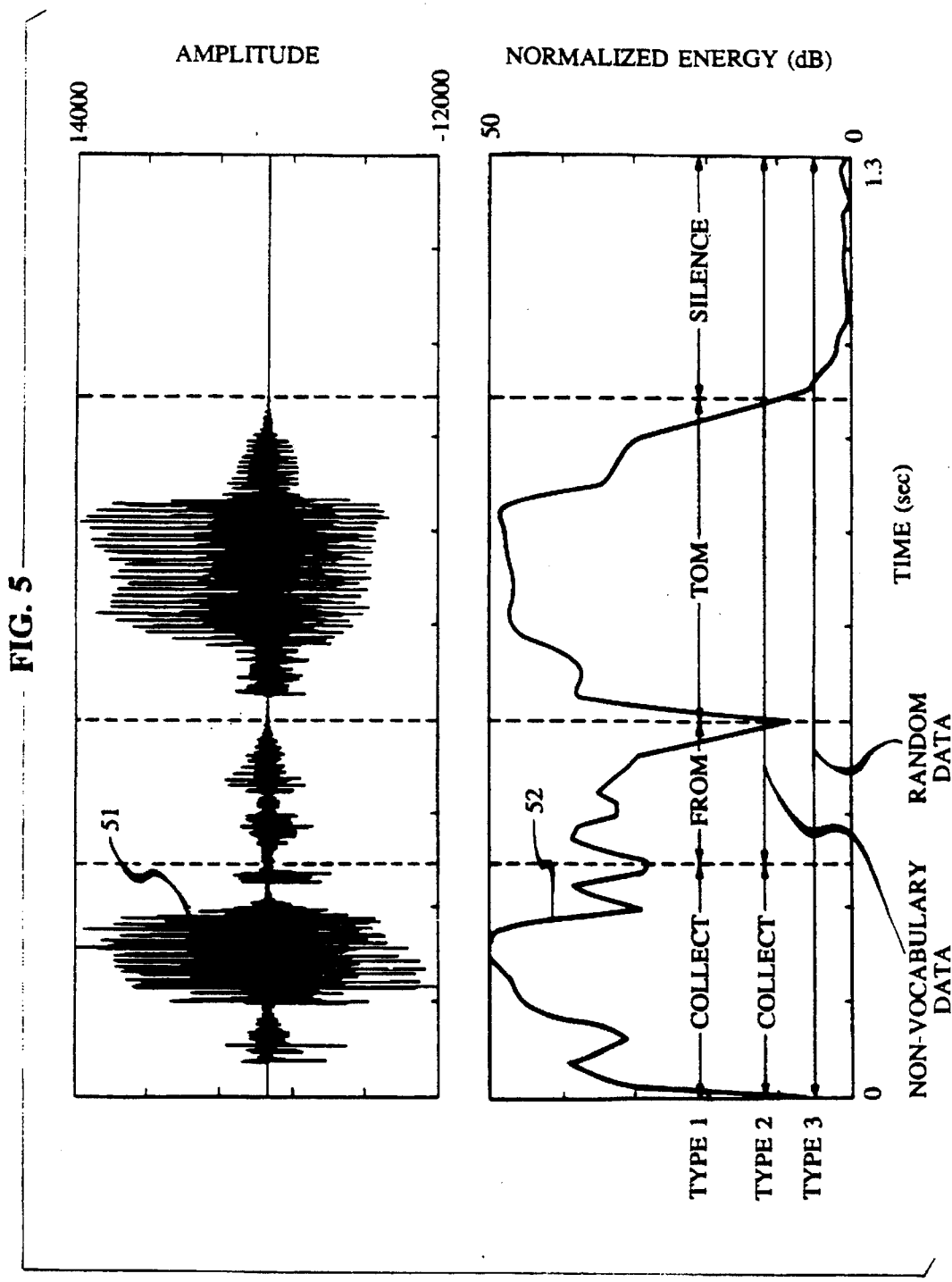
Figure 6:
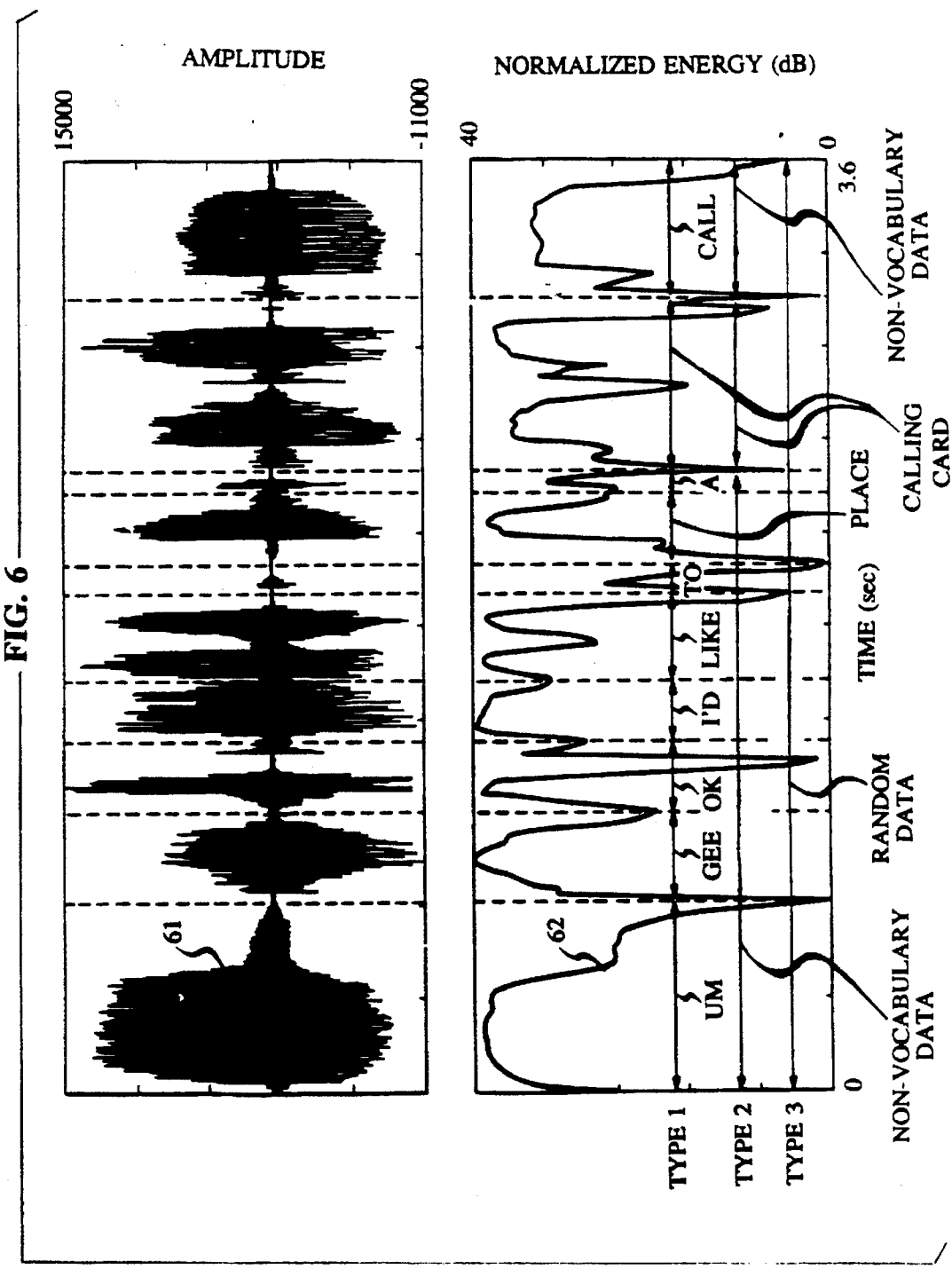

By way of example, the three most frequent out-of-vocabulary words for the call-type recognition task described earlier were 'um", "please", and "call". In order to utilize the technique of building models just for out-of-vocabulary words, a fully labeled and segmented database is required. Several examples of this type of segmented labeling are shown in FIGS. 4 through 6—labeled as Type 1 analysis. Based on such segmentation and labeling, hidden Markov models are typically generated for each of the n most frequently spoken out-of-vocabulary words, as well as a single HMM for background silence. Our experience has been that for the call type recognition task the recognition accuracy for isolated inputs is totally insensitive to the number of sink models, and the recognized accuracy for keywords in extraneous speech is also relatively insensitive to the number of sink model so long as the top 3 or 4 out-of-vocabulary words are involved. Hence this form of semi-automatic training is highly effective for wordspotting at least for certain tasks.

To make the sink model training more automatic, we modified the segmentation and labeling requirements to the classes of background, extraneous speech, and keywords. Examples of this type of labeling and segmentation are shown in FIGS. 4 through 6 and are labeled as Type 2 analysis. For this type of training, all extraneous speech sounds are combined and a single hidden Markov model is created as the sink model. A separate silence model is also generated from the silence segments. The number of states necessary for the silence model has been found to be only 1. With a single sink model and a single 1-state silence model, the recognition results for the call type recognition task were found to be comparable to those obtained using Type 1 analysis—i.e. Type 2 training is as effective as Type 1 training, even though less manual analysis is provided.

Figure 7:
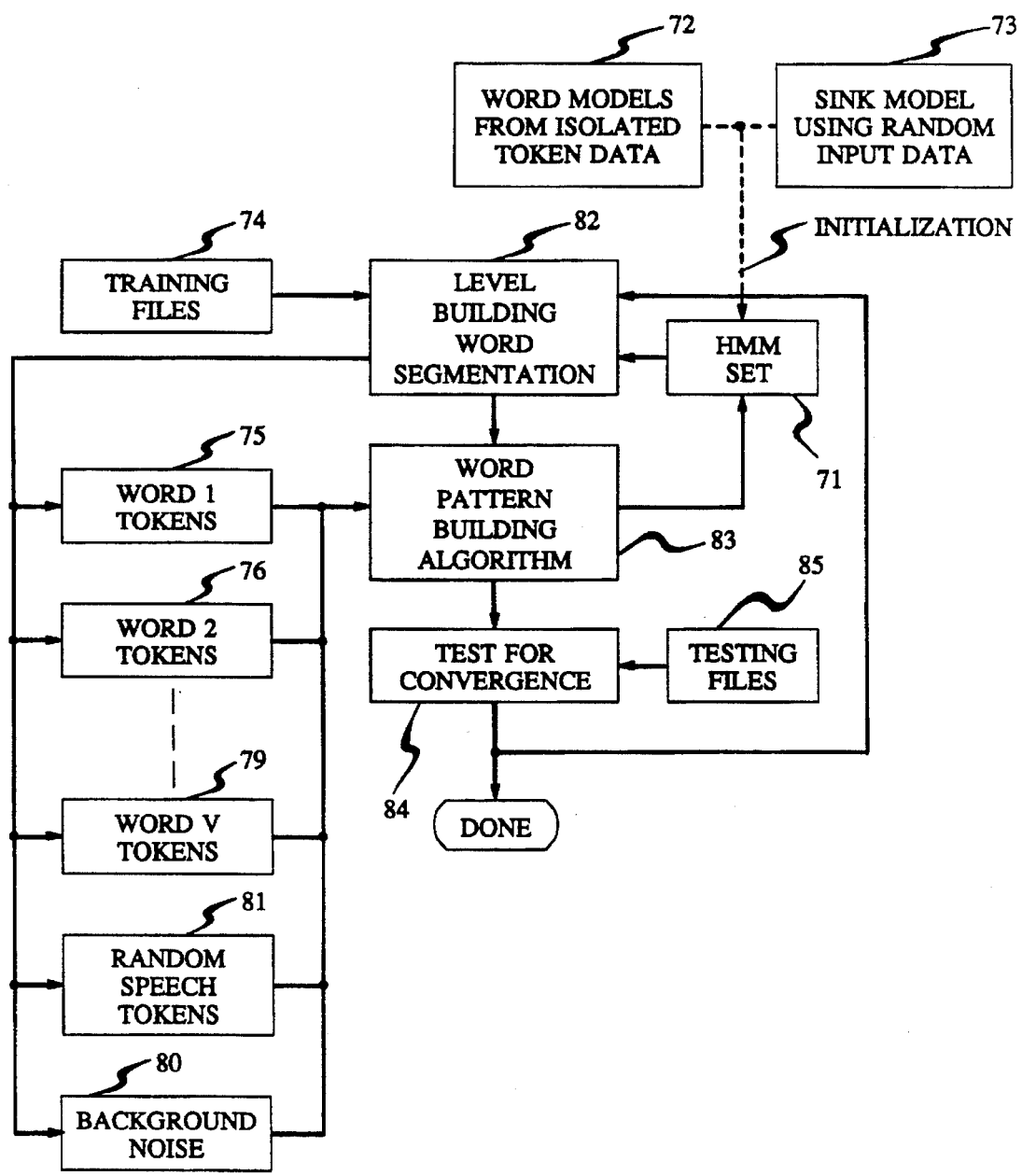
FIG. 7 shows a more detailed flow diagram for the practice of the invention.

The third, and fully automatic, training procedure that is proposed is to remove all labeling and segmentation constraints on the database used to train the sink model. The only requirement is that we have a database which contains the keywords as well as extraneous speech and background noise. Examples of such labeling can be seen in FIGS. 4 thru 6 denoted as Type 3 analysis. Even though a keyword is present in these examples., the entire utterance is used to initially train the sink model. FIG. 7, shows a block diagram of the training process used to obtain the final keyword and sink models. To initialize the training process, an HMM set 71 is built from the isolated vocabulary words and the pool of extraneous speech. Given this bootstrap model and the set of training data 74 that contains the vocabulary words, the segmental k-means training algorithm is used to optimally segment the training strings into vocabulary words 75-79, silence 80 and extraneous speech. New models are then created and the process iterates itself to convergence.

Using this fully automatic training procedure to generate a single sink model 81 the recognition accuracy remained the same for the call type recognition task as previously obtained with Types 1 and 2 analysis.

In summary, our preferred embodiment, a single sink model was generated, using the fully automatic training procedure just described. Recognition results on a standard recognition task were comparable to the best results obtained from semiautomatic training procedures. This indicates that a single sink model can be generated which incorporates both the characteristics of the extraneous speech and the background silence.

The algorithm disclosed herein, based on hidden Markov model technology, which was shown capable of recognizing a pre-defined set of vocabulary items spoken in the context of fluent unconstrained speech, will allow users more freedom in their speaking manner, thereby making the human-factors issues of speech recognition more manageable.

Various modification of these techniques, based on their underlying principles, will be apparent to those skilled in the art. For example, the grammatical constraint need not be limited to adjacency, but, instead, could require a selected relationship, such as slight overlap between the acoustic events being matched to a specific model and to a general model.

The invention claimed is:

1. A method for generating a sink model for use in a speech recognition system, said method comprising the steps of obtaining a first extraneous sound training token, obtaining a second extraneous sound training token, said first and second extraneous sound training tokens being other than repetitions of a particular one vocabulary item, and generating said sink model in response to a plurality of extraneous sound training tokens which includes said first and second extraneous sound training tokens.

2. The method of claim 1 wherein said first and second extraneous sound training tokens are respective different vocabulary items.

3. The method of claim 1 wherein said first and second extraneous sound training tokens are a background sound and a vocabulary item, respectively.

4. The method of claim 3 wherein said background sound includes a silence component.

5. The method of any one of claims 1 through 4 comprising the further step of combining said sink speech recognition model with a plurality of key word speech recognition models into a grammar which defines expected sequences of keywords and extraneous sounds.

6. The invention of any one of claims 1 through 4 wherein each of said plurality of speech recognition models is a Hidden Markov Model.

7. A sink model stored in a storage medium generated by the method of any one of claims 1 through 4.

* * * * *